Sept. 20, 1966 R. M. HILL 3,273,239
MACHINE HAVING MULTIPLE CUTTING ACTION FOR
CUTTING DIFFERENT TYPES OF PLANT
STEMS AT THE SAME TIME
Filed Sept. 17, 1964 2 Sheets-Sheet 1

INVENTOR
ROWLAND M. HILL
BY

ATTORNEY

Sept. 20, 1966                R. M. HILL                3,273,239
            MACHINE HAVING MULTIPLE CUTTING ACTION FOR
               CUTTING DIFFERENT TYPES OF PLANT
                     STEMS AT THE SAME TIME
Filed Sept. 17, 1964                              2 Sheets-Sheet 2

*INVENTOR*
ROWLAND M. HILL

BY

*ATTORNEY*

3,273,239
MACHINE HAVING MULTIPLE CUTTING ACTION
FOR CUTTING DIFFERENT TYPES OF PLANT
STEMS AT THE SAME TIME
Rowland M. Hill, 1718 W. 12 Mile Road,
Royal Oak, Mich.
Filed Sept. 17, 1964, Ser. No. 397,161
5 Claims. (Cl. 30—206)

This invention relates to a machine for cutting plant stems such as found in a hedge or in brush. The machine produces three types of cutting action for severing the various kinds of stems and the various sizes of stems.

Machines for cutting plant stems have been employed heretofore to facilitate cutting brush growth and trimming hedges, however, the several devices of the prior art have not proven entirely satisfactory inasmuch as they are complicated in design and construction, expensive to manufacture, difficult to use, and difficult to keep in operation. Moreover, each device of the prior art has only a single type of cutting action suited to average type and size of stem and they are not adapted to cut various sizes and kinds of stems with difficult cutting actions.

With the foregoing in view, the primary object of the invention is to provide a machine having multiple cutting action which is simple in design and construction, inexpensive to maintain, easy to use, easy to operate, which maintains itself in free unhampered operating condition, and which is capable of cutting various sizes and kinds of stems in one operation with different cutting actions.

An object of the invention is to provide a stem cutter or hedge trimmer which can be manufactured inexpensively as the component parts are easily made and the assembly of parts readily accomplished.

An object of the invention is to provide a stem cutting machine which may be made in various sizes and which can be operated with ease by professional and amateur users alike.

An object of the invention is to provide an annular plate having at least one set of parallel teeth extending in a curving conformation with a rotary blade having a limited cutting surface swinging in the area of the teeth on the plate.

An object of the invention is to provide a machine with a high speed blade with an inclined radial cutting edge which cuts medium size stems of medium flexibility with lop-off action where the stems are severed without additional support and without shearing or chewing action.

An object of the invention is to provide a machine with teeth for supporting stems of small size and great flexibility which are severed by the rotating blade and supported by the teeth.

An object of the invention is to provide the parallel teeth on the plate in a curving conformation with the root portions of the teeth angled to co-act with the cutting edge on the blade to entrap stems between the supporting edge on the tooth and the cutting edge on the blade.

An object of the invention is to provide a stem cutting machine having a high speed rotating cutter blade wherein the blade has a tip constituting a cutting tooth for removing portions of large woody stems until the stem is severed and wherein the cutting edge of the blade radially inwardly of the tip tooth is back drafted relative to the radial to urge the large stem into the tooth to provide cutting action and wherein the circumferential portion of the blade following the tooth abuts the stem limiting cutting action of the toothed tip to a small cut thereby producing small rapid cuts into the large stem until it is severed without jamming the machine.

An object of the invention is to provide a blade that rotates in spaced relationship relative to plate and which is deflectable so as to move closer to the plate so that the blade, when deflected, shaves off the accumulated sap, dirt, and fibers normally adhering to the plate to eliminate frictional obstruction and to insure the free running of the blade.

An object of the invention is to provide shaving edges on the blade for scraping the accumulated debris off the plate when the blade is deflected during its rotational operation.

These and other objects of the invention will become apparent by reference to the following description of the stem cutter or hedge trimmer embodying the invention taken in connection with the accompanying drawings in which.

Figure 1:
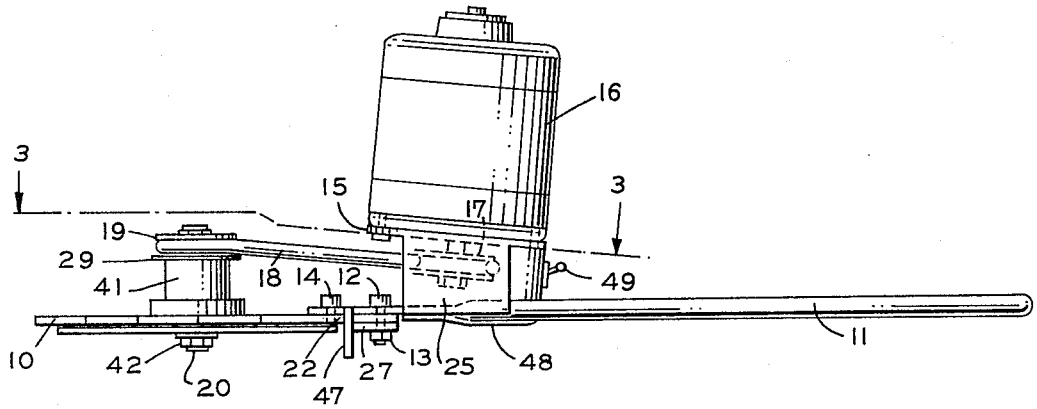
FIG. 1 is a side elevational view of a hedge trimmer embodying the invention.
Figure 2:
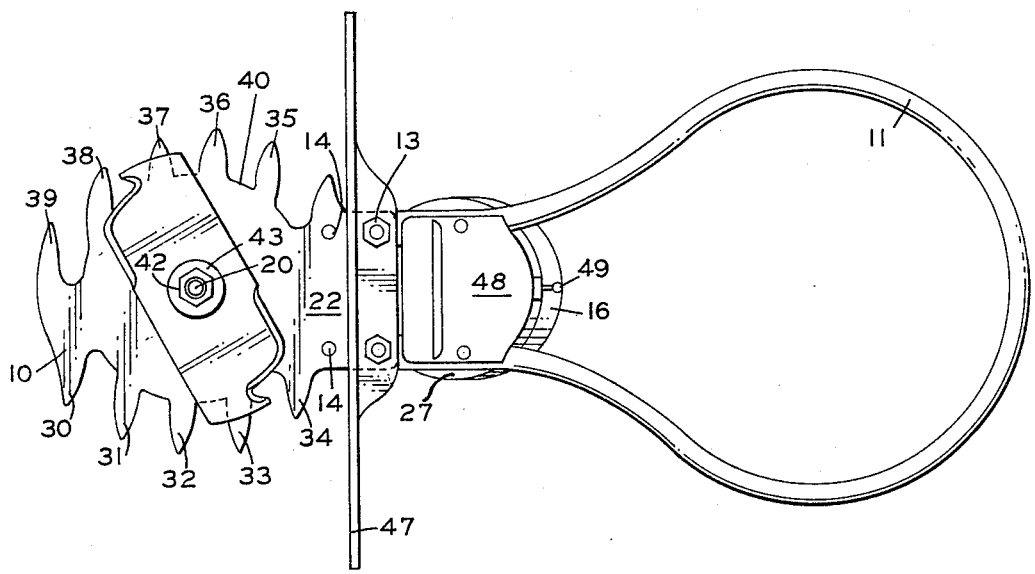
FIG. 2 is a bottom plan view of the device seen in FIG. 1.
Figure 3:
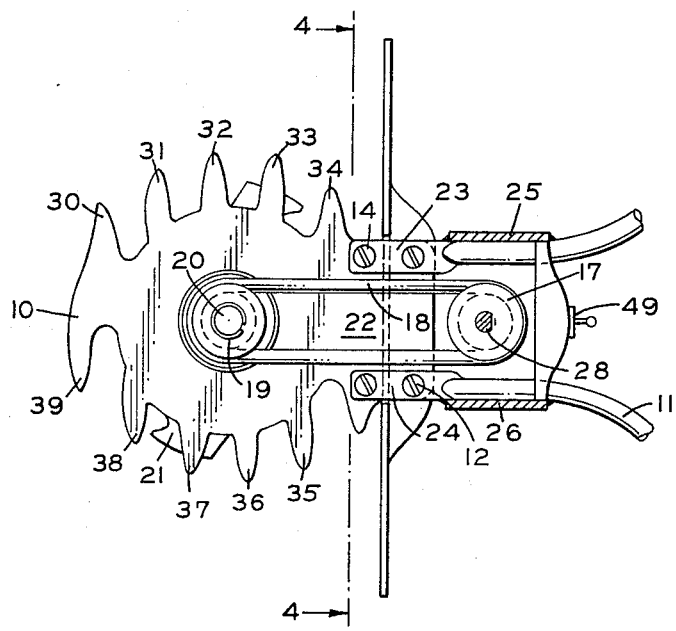
FIG. 3 is a top cross-sectional partial view of the device seen in FIG. 1 taken on the line 3—3 thereof.
Figure 6:
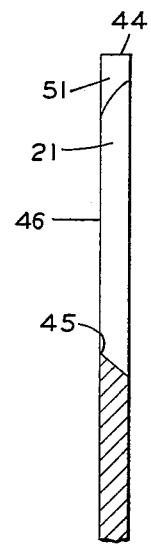
FIG. 6 is an enlarged cross-sectional view of the end of the blade seen in FIG. 5 showing the blade tip cutting tooth.
Figure 4:
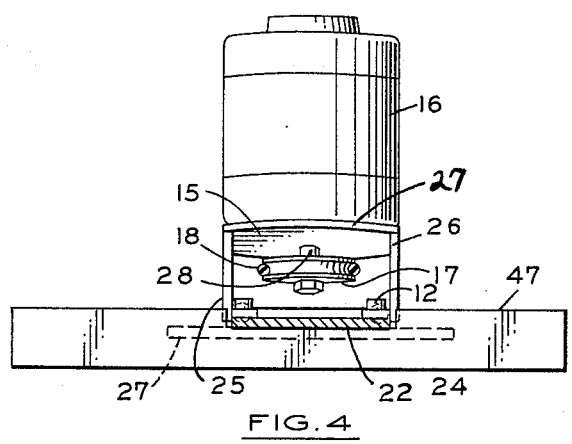
FIG. 4 is a cross-sectional view of the device seen in FIG. 3 taken on the line 4—4 thereof.
Figure 5:
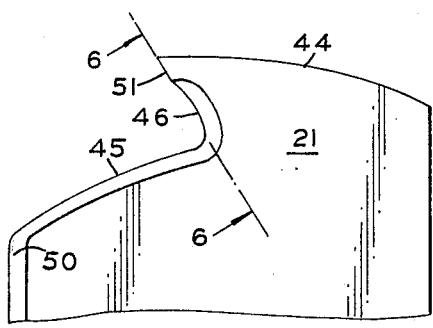
FIG. 5 is an enlarged plan view of one end of the blade.

The cutting machine of the invention is developed to solve the problems in cutting stems of various sizes and toughness in one operation. The machine uses a high speed rotary cutter to obtain a high velocity cut and a large number of cuts per minute. The machine has a rotary blade which has a radial cutting edge disposed on an angle relative to the radius of the blade. The cutting edge is thus designed to draw the stem or branch to be cut radially into itself. The blade has an outer peripheral surface behind the cutting edge which acts to hold back some of the stems or branches to reduce the possibility of too rapid feeding of large branches or to prevent the entry of too large a number of small branches to the cutting edge of the blade. The blade has a nose or tipped tooth between its radial cutting edge and its outer peripheral surface. This tooth is so positioned and adapted that it may cut a groove in large branches or stems by chewing off small slices in a groove until the large stem is severed. The radial cutting surface cuts off medium size stems of medium flexibility without any nose tooth cutting.

The support plate of the device has support teeth over which the blade rotates. In the event that the stems to be cut are very small they are drawn in by the back angle of the radial cutting surface and flexibly move against the side edge of a support tooth. The side edge of the tooth supports the flexible stem. Upon the flexing movement of the stem stopping when abutted by a support tooth on the plate, the cutting surface on the blade moves through the small stem cutting it off.

The peripheral contour of the blade, the back-draft or rake on the radial cutting edge of the blade and the toothed nose of the blade all cooperate to provide control of the amount of feed of large branches, medium size branches or stems, and new soft growth of twigs.

The rotating blade is separated by a small space from the stationary support plate having the support teeth. This eliminates friction or rubbing between the surface of the plate and the surface of the blade. This space may be decreased by the presence of dried sap and accumulated fiber. The blade is somewhat flexible and the angle ground on the edge of the cutting surface of the blade tends to pull the blade toward the plate during the cutting action. Thus the thickness of the blade is designed to permit a slight movement or vibration. The blade also has shaving edges radially inwardly of the cutting edge. As the blade flexes or vibrates during its cutting action it moves closer to the plate and the shaving edges clean off the build-up of sap, fibers, dirt, and dust. The blade is designed relatively wide to control undesirable deflection and vibration in conjunction with cutting and shaving the build-up from the plate.

In the cutting of stems and branches there is a definite shock. While the cutting nose and following peripheral edge of the blade usually prevent over-feeding of too large a stem or too large an accumulation of stems, sometimes this may occur. To minimize shocks under these conditions, a round flexible rubber belt drive is provided between a motor pulley and a pulley on a shaft which rotates the blade. The driven pulley on the rotating blade shaft is provided with an enlarged shoulder flange. The belt travels in a plane from the motor pulley to the flange on the driven pulley. At the flange, the belt changes angle slightly and bends over the shoulder flange. Under shock loads the shoulder flange tends to move the flexible rubber belt out of driving relationship with the drive groove of the driven pulley to eliminate shock by providing instantaneous slippage of the belt. In this way pulley slippage and belt stretch are used to reduce cutting shocks from being transmitted directly to the motor.

The device is described relative to cutting hedges as a hedge provides the various branches or stems usually found in any type of brush. As the hedge grows, there is a continual shifting of main stems due to the action of light and by the pressure by adjacent stems. There will be at any one time many types of branches in the line of cut. On the side of the hedge, growth is always on one side of the main stem and this stem will gradually bend toward the outside due to the unbalance of weight and also to obtain more light. On the side of an older hedge, branches or main stems up to ½ inch in diameter are usual. These heavy wooden stems do not cut readily. These heavy wooden stems in conjunction with the medium size growth and tender new growth provide a problem for a hedge trimmer machine.

However, with the device of the invention, the cutting nose cuts a groove through these heavy stems until they are severed and at the same time the medium size stems are lopped off by the radial cutting edge and the tender new growth is supported by the support teeth on the plate and sheared off by the cutting edge. This happens all at the same time providing the operator with a tool that cuts all kinds of branches.

Referring now to the drawings wherein like numerals refer to like and corresponding parts throughout the several views, the stem or branch cutting machine shown therein comprises a plate 10. The plate 10 is secured to a looped handle 11. Bolts 12 and nuts 13 and machine screws 14 may be used to connect the plate 10 and handle 11 together. A bracket 15 is fastened to the handle 11. The bracket 15 supports a motor 16. The motor 16 has a pulley 17. A belt 18 engages the motor pulley 17. The belt 18 also engages a driven pulley 19. The driven pulley 19 is fixed on a shaft 20. The shaft 20 extends through an axial aperture in the plate 10. A bearing 41 is fixed on the plate 10 supports the shaft 20 in its rotation. A blade 21 is fixed on the shaft 20. The blade 21 is in spaced relationship to the plate 10.

More particularly, the plate 10 has a centrally annular portion and a radially projecting arm 22. The looped handle 11 has attaching ends 23 and 24. The attaching ends 23 and 24 of the looped handle 11 are bolted to the projecting arm 22 of the plate 10. The bolts 12 and nuts 13 and machine screws 14 secure the projecting arm 22 of the plate 10 on the extending ends 23 and 24 of the looped handle 11.

The bracket 15 is U-shaped in cross-section. The bracket 15 has depending legs 25 and 26 which are fastened to the attaching ends 23 and 24 of the looped handle 11. The bracket 15 has an integral web portion 27 elevated above the handle 11 by the legs 25 and 26. The web portion 27 lies at an angle to the plane of the plate 10 and handle 11. The web portion 27 has an aperture receiving the motor shaft 28. The motor 16 is secured on the web portion 27 of the bracket 15. This disposes the motor pulley 17 on the motor shaft 28 in a plane at an angle to the plane of the plate 10 and looped handle 11.

The extended plane of the motor pulley 17 intersects the driven pulley 19 at the edge of the driven pulley 19. The driven pulley 19 is positioned in a plane parallel to the toothed plate and the handle 11. The driven pulley 19 has an enlarged bottom flange shoulder 29. The belt 18 makes its transition between the plane of the motor pulley 17 and the plane of the driven pulley 19 by bending over the flange shoulder 29 on the driven pulley 19.

When overloaded, the driven pulley tends to slow down or it may stop. The shoulder 29 on the driven pulley 19 cams the belt 18 out of the driven pulley groove in conjunction with the angular bend in the belt at the shoulder 29 when an overload is encountered. Under this condition, the belt 18 is stretched and the shoulder cams the belt 18 out of the groove of the driven pulley 19. This may be momentary or for a short time period. This relieves the entire device and its components of instantaneous shock loads.

The plate 10 has semicircular sections in which the plate 10 has support teeth. Parallel support teeth 30, 31, 32, 33, and 34 lie in one section. Parallel teeth 35, 36, 37, 38, and 39 lie in the other section. The teeth 30–34 and teeth 35–39 are oppositely disposed. The teeth 30–34 parallel one another and are located about one-half of the curve of the plate 10. The teeth 35–39 also parallel one another and are located about the other half of the curve of the plate 10. The root portions of the teeth 30–39 are deviced by arcuate segments 40 of the plate 10. The teeth 30–39 have edges which provide a support for flexible stems. The teeth 30–39 also provide means for limiting the entrance of stems to the blade. The teeth also provide means for preventing the blade from pulling too many stems into the blade.

The blade 21 is wide and relatively rectangular. The blade 21 has oppositely extending ends. The blade 21 has a central aperture receiving the driven shaft 20. The shaft 20 and blade 21 are connected together by the nut 42 and washer 43. Key means, not shown but well known, located between the shaft 20 and the blade 21 insure rotation of the shaft 20 and the blade 21 together as a unit.

Each end of the blade 21 has an outer curving end portion 44 on a relatively long radius, an inner curving end portion 45 on a relatively short radius, a cutting edge 46 in the center portion of the blade lying on a back angle to the radial between the end portions 44 and 45, and a nose tooth 51 at the intersection of the cutting edge 46 with the outer end portion 44.

A guide or guard bar 47 may be attached to the device as by the bolts 12 and nuts 13. A closure plate 48 is fixed on the bottom of the web 27 of the bracket 15 and supports a switch 49 which controls operation of the motor 16.

Adjacent the leading side of each end of the blade 21, the blade has side shaving edges 50 in the location of the body of the toothed plate 10. The blade 21 is slightly spaced from the plate 10. The shaving edges 50 do not scrape against the blade 11.

In operation the operator closes the switch 49 energizing the motor 16. This causes the motor shaft 28 and motor pulley 17 to rotate. Rotation of the motor pulley 17 is transferred to the drive pulley 19 by the belt 18 which is relatively flexible. The belt travels in the plane of the motor pulley 17 between the motor pulley 17 and the enlarged bottom flange shoulder 29 on the driven pulley 19. At the flange shoulder 29 the belt bends and travels around the driven pulley 19 in the plane of the driven pulley 19. The driven pulley 19 transfers rotational drive to the driven shaft 20 and to the blade 21. This may be a high speed drive such as 15,000 r.p.m. The blade 21 rotates the cutting edge 46 and nose tooth 51 past the sets of parallel support teeth 30–34 and 35–39.

In use, the operator advances the device in a direction parallel to one of the sets of parallel support teeth 30–34 or 35–39 into the stems such as found in a hedge. This advances the rotating nose tooth 51 and cutting edge 46 into cutting relationship with the stems. The nose tooth cuts into the large stems and the cutting edge lops off medium size stems. The support teeth 30–39 holds the small flexible stems from moving away from the blade and the cutting edge 46 cuts them off. The support teeth block the entrance of some stems and prevent over feeding.

The angle of the cutting edge 46 and nose tooth 51 tends to move the large stems radially inwardly. The outer curving end portion 44 abuts the large stem and allows only a small inward movement of the stem. This provides for small grooving cuts by the nose tooth 51.

As the stems are cut, dirt, fiberous dust, and sap mist is developed in the location of the plate 10 body under the blade 21. The dust and mist collect on the stationary plate 10. This creates a layer or build-up of fiberous gum on the plate 10 which ordinarily would impede desired rotational speed of the blade 21 were it not for removal of the device now described.

The cutting edge 46 on the blade 21 is back drafted so that as it shears off stems, there is a camming action set-up between the stems and the back drafted cutting edge 46. This causes the end of the blade 21 to move or flex close toward the plate 10 whereupon the shaving edges 50 on the blade 21 move closer to the plate 10 in a shaving action and remove a portion of the build-up layer of fiber and gum. This keeps the blade 21 clear of the plate 10 so that it may rotate at high speed without impediment.

The novel device constitutes an inexpensive, light weight, efficient machine which may be used safely and which cuts stems and trims hedges rapidly and accurately.

Although but a single embodiment of the device has been shown and described in detail, it is obvious that many changes may be made in the shape, size, detail, and arrangement of the various elements of the invention within the scope of the appended claims.

I claim:

1. A machine for cutting stems of various size and toughness comprising,
    a substantially annular plate having an axial aperture,
    a shaft rotatably positioned in said plate aperture,
    a relatively wide substantially rectangular blade on said shaft;
    said shaft and said blade rotating relative to said plate;
    said plate having a semicircular section;
    spaced support teeth on said plate in said semicircular section lying parallel to one another in a curving conformation;
    a cutting edge on said blade lying at a back angle to the radial extending beyond said plate into the location of said support teeth;
    an outer curving end portion on said blade trailing said cutting edge,
    an inner curving end portion on said blade in advance of said cutting edge, and
    a nosetooth at a back angle to the radial on said blade at the juncture of said cutting edge and said outer curving end portion on said blade;
    said device having a cutting feed direction parallel to said support teeth on said plate;
    said nose tooth cutting a groove in large stems by rapidly removing small chips with said nose tooth back angle moving the stem into said tooth and said outer curving end portion, said blade abutting a large stem and permitting only small advances of the large stem into said nose tooth preventing over feeding;
    said backed angle nose tooth and cutting edge on said blade moving medium size and small stems into the location of said cutting edge on said blade;
    said cutting edge on said blade lopping-off medium size stems and small stems of average flexibility;
    said cutting edge on said blade bending small stems of great flexibility against said support teeth;
    said support teeth holding small stems of great flexibility against flexing movement;
    said cutting edge on said blade cutting off small stems of great flexibility as positioned and supported by said support teeth.

2. In a device as set forth in claim 1, said blade lying in spaced relationship to said plate to provide free clearance therebetween; said blade cutting edge being ground back at an angle for deflecting said blade toward said plate due to the cam forces involved in cutting stems; said plate having sides with shaving edges coming in contact with said plate upon blade deflection to remove deposits of sap, adhered dirt, and fibers therefrom to maintain said blade in free running condition.

3. In a device as set forth in claim 1, a pulley on said shaft, a radially enlarged shoulder flange on said pulley, a belt on said pulley angled slightly over said flange; said flange camming said belt out of driving relationship with said pulley upon said pulley tending to stop under shock loads as when said blade cutting edge is overloaded.

4. In a device as set forth in claim 1 said support teeth having root portions and adjacent sides aligned relatively radially;
    said cutting edge on said blade being back-angled relative to the radial;
    said root portions and adjacent sides on said support teeth on said plate holding flexible stems relative to said cutting edge on said blade at a closing angle relative to said cutting edge thereby entrapping the stems as said blade swings relative to said support teeth.

5. A machine for cutting stems of various size and toughness such as found in shrubs, hedges, and undergrowth, comprising,
    a substantially annular plate having,
    a bottom surface,
    a top surface,
    an axial aperture,
    opposite semicircular sections,
    support teeth on said plate projecting and lying parallel to one another in each semicircular section of said plate in a curving conformation, and
    arcuate segments on said plate between said teeth,
    a shaft in said plate axial aperture,
    a bearing on said plate top surface rotationally supporting said shaft,
    a blade on said shaft lying in a plane parallel to and spaced from said plate bottom surface,
    said blade being relatively wide and having sides with shaving edges over said plate for removing foreign material from the bottom surface of said plate during blade rotation;
    each end of said blade having two curving portions, struck on two diameters with one diameter being long and axially centered and the other diameter being short and axially off-set,
    a cutting edge leading on a back angle relative to the radial from said blade end outer curving portion to said blade end inner curving portion, and
    a nose tooth on said blade at the radially outer extremity of said cutting edge;

said blade end inner curving portion wiping past said plate;

said back-angled radial cutting edge on said blade moving against stems with a radially inwardly camming action;

said arcuate segments of said teeth holding stems in position in front of said cutting edge;

said blade cutting edge being ground back axially for engaging stems with a camming action during cutting deflecting said blade in its rotation under cutting loads so as to move said shaving edges on the sides of said blade into contact with foreign material on the bottom surface of said plate to remove collected foreign material therefrom to keep the space between said blade and plate clear to insure a free-running frictionally-unhampered blade.

References Cited by the Examiner

UNITED STATES PATENTS

| | | | |
|---|---|---|---|
| 2,091,827 | 8/1937 | Mercatoris | 30—276 |
| 2,532,982 | 12/1950 | De Young | 30—276 X |
| 2,645,010 | 7/1953 | Holmes | 30—206 X |
| 2,883,746 | 4/1959 | Gilsi | 30—205 |

WILLIAM FELDMAN, *Primary Examiner.*

J. C. PETERS, *Assistant Examiner.*